United States Patent
Ikemoto et al.

(10) Patent No.: US 8,004,940 B2
(45) Date of Patent: Aug. 23, 2011

(54) OPTICAL DISK DEVICE AND ROTATION CONTROL METHOD

(75) Inventors: Yuichiro Ikemoto, Kanagawa (JP); Koji Ashizaki, Tokyo (JP); Tatsumi Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 138 days.

(21) Appl. No.: 12/424,834

(22) Filed: Apr. 16, 2009

(65) Prior Publication Data

US 2009/0288108 A1 Nov. 19, 2009

(30) Foreign Application Priority Data

May 19, 2008 (JP) .................... 2008-131251

(51) Int. Cl.
*G11B 15/00* (2006.01)
(52) U.S. Cl. .................... 369/47.47; 369/53.3
(58) Field of Classification Search .......... None
See application file for complete search history.

(56) References Cited

U.S. PATENT DOCUMENTS 6,137,757 A * 10/2000 Kinoshita .......... 369/47.41

FOREIGN PATENT DOCUMENTS

| JP | 10-106136 | 4/1998 |
| JP | 2001-291235 | 10/2001 |
| JP | 2005-346778 | 12/2005 |

OTHER PUBLICATIONS

U.S. Appl. No. 12/489,581, filed Jun. 23, 2009, Ikemoto, et al.

* cited by examiner

*Primary Examiner* — Paul Huber
(74) *Attorney, Agent, or Firm* — Oblon, Spivak, McClelland, Maier & Neustadt, L.L.P.

(57) ABSTRACT

An optical disk device of the present invention includes a spindle motor, an optical pick-up, and a rotation control portion. The spindle motor is a rotational drive portion that rotates an optical disk, on an information recording surface of which a plurality of addresses are recorded. The optical pick-up records an information signal onto and plays back the information signal from the information recording surface of the optical disk that is rotated by the spindle motor. The rotation control portion controls the rotation of the optical disk by the spindle motor. In this case, the rotation control portion performs control based on a first reference signal that can be read off the optical disk, such that the optical disk is rotated at a speed that is based on a specified clock count.

6 Claims, 6 Drawing Sheets

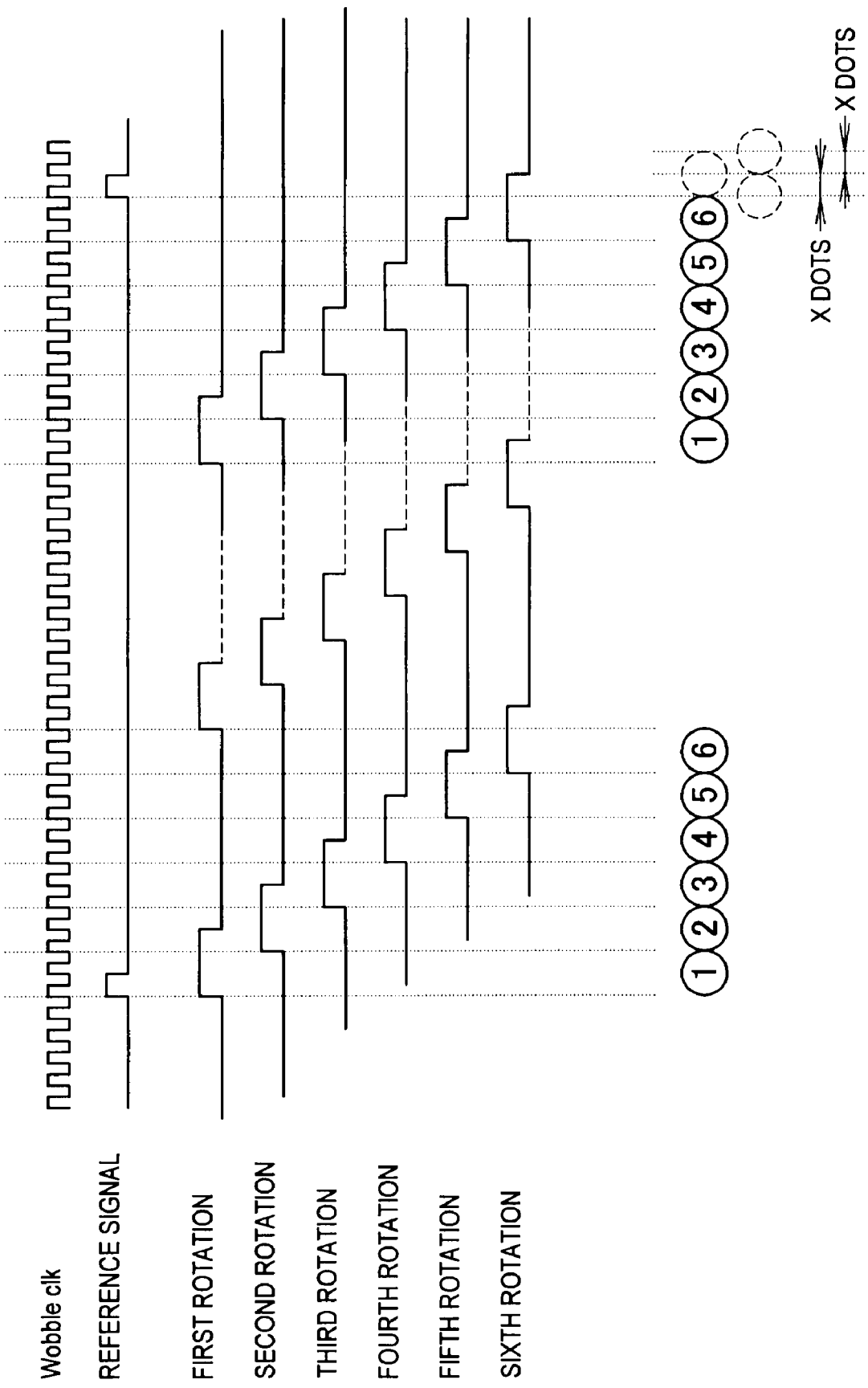

OPTICAL DISK DEVICE AND ROTATION CONTROL METHOD

BACKGROUND OF THE INVENTION

1. Field of the Invention

The present invention relates to an optical disk device and a rotation control method.

2. Description of the Related Art

In recent years, it has become routine to use an optical disk as a recording medium that records video and audio in a digital format. It is possible to write visible information on a label surface that is a non-recording surface of the optical disk. For example, writing information that pertains to the contents of the optical disk and the like makes it easier to manage the optical disk.

A technology is known that provides a label surface on the optical disk on which information can be printed by an ink jet printer. The printing by the ink jet printer has the advantages that the visible information can be written on the label surface at high speed and can be written in an attractive form. It is possible to print the visible information on the label surface of this sort of optical disk using an ink jet printer that is separate from an information recording device that records information on the recording surface of the optical disk. It is also possible to print the visible information on the label surface of the rotating optical disk using an information recording device that is provided with a printing unit and thus does not require a separate printing device (for example, Japanese Patent Application Publication No. JP-A-2001-291235 and Japanese Patent Application Publication No. JP-A-2005-346778).

In Japanese Patent Application Publication No. JP-A-2001-291235, an optical disk drive device is disclosed that is capable of printing the entire label surface by using a label printing head with a simple configuration that moves reciprocally in the radial direction of the optical disk and has a degree of freedom in only one dimension, utilizing the rotation of the optical disk during one of data recording and playback. In Japanese Patent Application Publication No. JP-A-2005-346778, a disk drive device is disclosed that, in a case where an image will be formed on a label surface of a recording disk, performs label surface print tracking control based on pits that are arrayed as guides to the label surface.

In a case where an ink jet head can move in the radial direction of the optical disk and the printing is performed by causing the optical disk to rotate, as described above in Japanese Patent Application Publication No. JP-A-2001-291235 and Japanese Patent Application Publication No. JP-A-2005-346778, a location exists on the optical disk at which positions where the printing within one revolution of the optical disk starts and ends are adjacent to one another. Thus, in a case where the printing is done by causing the optical disk to rotate, streak-shaped irregularities occur due to overlapping of dots and gaps between dots at the boundary between the printing start position and the printing end position. In order to suppress the occurrence of these streak-shaped irregularities, it is necessary to control the timing of the discharge of the ink droplets with high precision.

SUMMARY OF THE INVENTION

In the optical disk drive device in Patent Application Publication No. JP-A-2001-291235, the revolution speed of the optical disk varies according to the position of a data head, so it is necessary to control the timing of the ink discharge in accordance with the variations in the revolution speed. However, a problem exists in that, in a case where the timing of the ink discharge is synchronized to the rotation of the optical disk at a fixed linear speed, correction of the timing must be performed frequently, which makes control more complicated.

Furthermore, in the disk drive device that is described in Patent Application Publication No. JP-A-2005-346778, when the visible information is formed on the label surface of the disk, control is performed that makes a revolution speed of a spindle motor constant, such that a pulse that is generated by a frequency generator will have a fixed frequency. It is therefore necessary to provide a frequency generator that is directly connected to a rotating shaft of the spindle motor, which creates a problem of higher cost for the device. In addition, the disk drive device that is described in Patent Application Publication No. JP-A-2005-346778 is configured such that it acquires information on the position of the rotationally driven recording disk by detecting the pit array on the disk. It is therefore necessary to provide the pit array on the label surface of the disk in advance, before recording the visible information on the label surface of the disk.

Accordingly, the present invention addresses these problems and provides an optical disk device and a rotation control method that are new and improved and that are capable of precisely rotating a recording medium at a desired revolution speed and easily controlling the rotation.

According to an embodiment of the present invention, there is provided an optical disk device that includes a rotational drive portion, an optical pick-up, and a control portion. The rotational drive portion rotates a recording medium, on an information recording surface of which a plurality of addresses are recorded. The optical pick-up records an information signal onto and plays back the information signal from the information recording surface of the recording medium that is rotated by the rotational drive portion. The control portion controls the rotation of the recording medium through the rotational drive portion. In this case, the control portion performs control based on a first reference signal that can be read off the recording medium, such that the recording medium is rotated at a speed that is based on a specified clock count.

According to the present invention, the rotation of the recording medium is controlled based on the first reference signal that can be read off the recording medium, such that the recording medium is rotated at a speed that is based on the specified clock count. In this process, using the first reference signal that is built into the recording medium to control the rotation of the recording medium makes it possible to rotate the recording medium with good precision. Furthermore, using the first reference signal that can be read off the recording medium to perform the rotation control makes it possible to perform the control easily, without requiring generation of a separate signal to be used for the rotation control.

The control portion can also include a reference signal generation portion, a measurement portion, a comparison portion, and a reference address control portion. The reference signal generation portion could generate a second reference signal based on the first reference signal. Based on the second reference signal, the measurement portion could measure a current clock count during one revolution of the recording medium, based on a specified reference address among the plurality of the addresses that serves as a reference for rotation control. The comparison portion could compare the current clock count that is measured by the measurement portion and a target clock count during one revolution of the recording medium. The reference address control portion could change the reference address based on a result of the comparison by the comparison portion. Changing the reference address based on the result of the comparison of the current clock count and the target clock count would make it possible to rotate the recording medium with greater precision.

The comparison portion may also determine whether a difference between the current clock count and the target clock count is within a specified count, and the reference address control portion may also change the reference address in a case where the difference between the current clock count and the target clock count is greater than the specified count. This would make it possible to correct any discrepancy between the current clock count and the target clock count, which corresponds to a revolution speed that serves as a target.

At this point, in a case where the current clock count is greater than the target clock count, the reference address control portion may also determine that the reference address is greater than an assumed still address and decrease the reference address. Furthermore, in a case where the current clock count is less than the target clock count, the reference address control portion may also determine that the reference address is less than the assumed still address and increase the reference address. Changing the reference address in this manner makes it possible to correct a deviation from the target clock count, which corresponds to the target revolution speed.

A printing head that discharges ink droplets onto a label surface of the recording medium can also be provided. The comparison portion can also determine the target clock count based on a dot interval clock count that indicates an interval between the ink droplets and on a number of lines that are printed during one revolution of the recording medium.

The reference address control portion may also change the reference address such that an amount of overlap of the ink droplets that are discharged from the printing head onto the label surface of the recording medium at a printing start position and a printing end position is not greater than a specified interval. The specified interval can be a range within which a difference in print density due to the overlapping of the ink droplets is not noticeable, such as half a dot, for example.

According to another embodiment of the present invention, there is provided a rotation control method that includes a step of rotating a recording medium, on an information recording surface of which a plurality of addresses are recorded. The rotation control method also includes a step of recording an information signal onto and playing back the information signal from the information recording surface of the rotated recording medium. The rotation control method also includes a step of controlling the rotation of the recording medium. In this case, the step of controlling the rotation of the recording medium is performed based on a first reference signal that can be read off the recording medium, such that the recording medium is rotated at a speed that is based on a specified clock count.

According to the embodiments of the present invention, an optical disk device and a rotation control method can be provided that are capable of precisely rotating a recording medium at a desired revolution speed and easily controlling the rotation.

BRIEF DESCRIPTION OF THE DRAWINGS

FIG. 6 is an explanatory figure for explaining a method of changing the still address according to a second embodiment of the present invention.

DETAILED DESCRIPTION OF THE PREFERRED EMBODIMENTS

Figure 1:
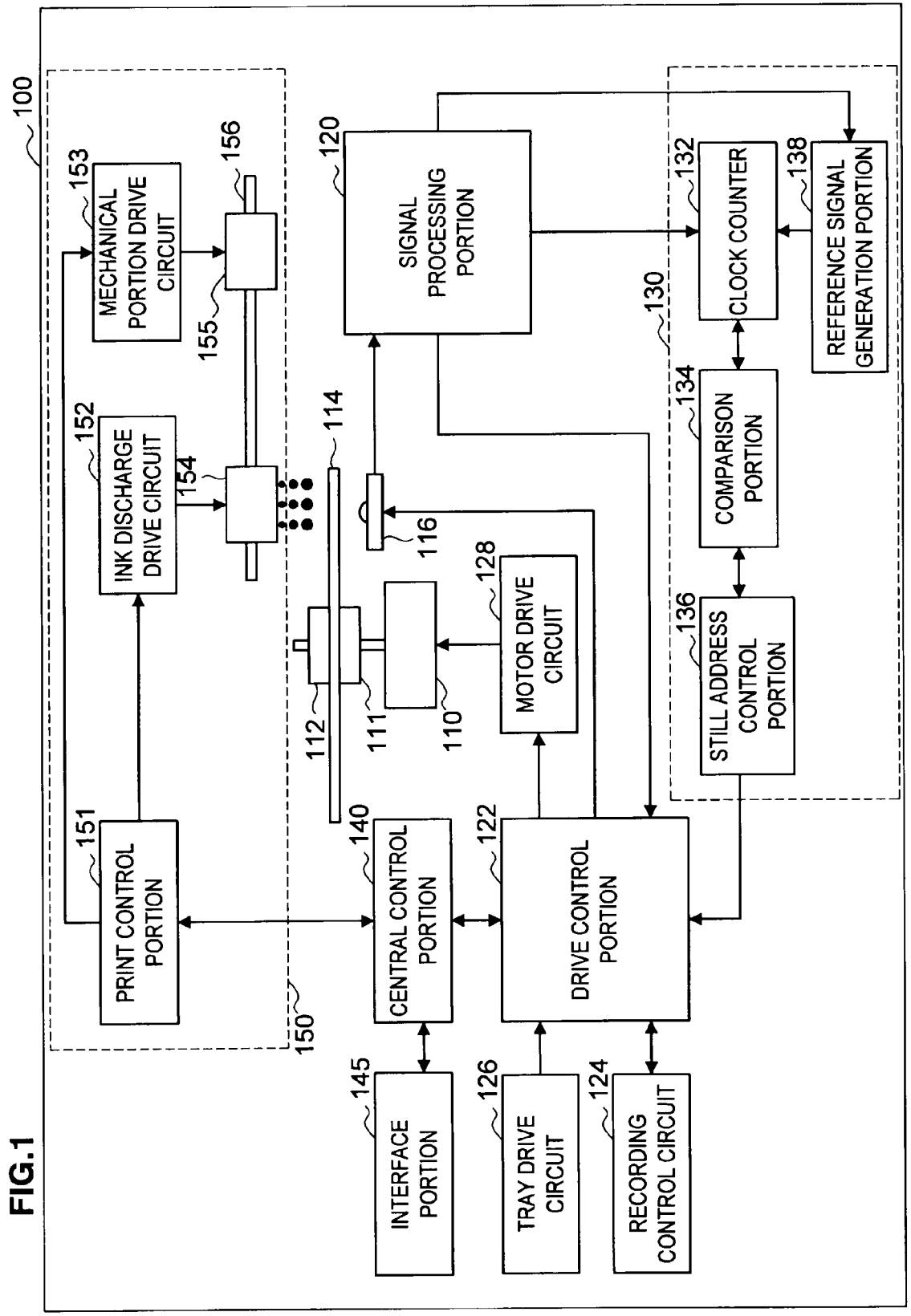
FIG. 1 is a block diagram that shows a configuration of an optical disk device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, an optical disk device 100 according to a first embodiment of the present invention will be explained based on FIG. 1. Note that FIG. 1 is a block diagram that shows a configuration of the optical disk device 100 according to the present embodiment.

Configuration of the Optical Disk Device

The optical disk device 100 according to the present embodiment is configured to be capable of newly recording an information signal on a recording surface of an optical disk 114 and playing back a prerecorded information signal and to be capable of printing visible information such as a character, a picture, and the like on a label surface of the optical disk 114. The optical disk 114 may be, for example, a Compact Disc-Recordable (CD-R), a Digital Versatile Disc-Rewritable (DVD-RW), or the like.

As shown in FIG. 1, the optical disk device 100 is configured such that it includes a spindle motor 110 that rotates the optical disk 114, an optical pick-up 116, a signal processing portion 120, a rotation control portion 130, a central control portion 140, and a printing portion 150.

The spindle motor 110 is a rotational drive portion that rotates the optical disk 114. A table 111 on which the optical disk 114 is placed is provided on a rotating shaft of the spindle motor 110. Engaging a center hole of the optical disk 114 with the table 111 makes it possible to rotate the optical disk 114 as a single unit with the table 111. The spindle motor 110 is also provided with a chucking plate 112 that, from above the optical disk 114 that is engaged with the table 111, holds the optical disk 114 in place. The chucking plate 112 is supported by a rotatable support plate (not shown in the drawings) and can rotate as a single unit with the optical disk 114. The holding of the optical disk 114 in this manner by the chucking plate 112 and the table 111 prevents the optical disk 114 from coming off of the table 111.

The optical pick-up 116 is configured from a light emitting portion that emits light and a light receiving portion that receives a returning portion of the light that was emitted from the light emitting portion. The optical pick-up 116 records an information signal by applying light to an information recording surface of the optical disk 114 that is rotated by the spindle motor 110. By using the light receiving portion to detect the returning portion of the light that was emitted from the light emitting portion, the optical pick-up 116 can also play back an information signal that has been recorded on the information recording surface in advance. The optical pick-up 116 is mounted on a pick-up base (not shown in the drawings) and is moved as a single unit with the pick-up base.

The signal processing portion 120 is a processing portion that generates a playback data signal based on a signal (for example, a radio frequency (RF) signal) that is input from the optical pick-up 116. Also based on the RF signal, the signal processing portion 120 detects a signal that has a specific pattern, such as a synchronization signal or the like, and a position data signal that indicates position information for the optical disk 114. The signal processing portion 120 outputs the generated playback data signal and the detected position data signal to a drive control portion 122 that is described below. The signal processing portion 120 also outputs at least the position data signal to the rotation control portion 130, which is described later.

The drive control portion 122 outputs a control signal to a motor drive circuit 128 that is described below and controls a pick-up drive motor (not shown in the drawings) that drives the spindle motor 110 and the pick-up base. The drive control portion 122 also outputs a control signal to the optical pick-up 116 and controls a tracking servo and a focusing servo such that the light that is emitted from the optical pick-up 116 follows a track on the optical disk 114. The drive control portion 122 also outputs the playback data signal to a recording control circuit 124 that is described below and outputs to a tray drive circuit 126 an opening and closing control signal that controls opening and closing of a tray. In addition, of the data signals that are input from the signal processing portion 120, the drive control portion 122 outputs at least the position data signal to the central control portion 140, which is described later.

The recording control circuit 124 performs encoding processing, modulation processing, and the like on the playback data signal that is input from the drive control portion 122 and outputs the processing playback data signal to the drive control portion 122. In addition, the tray drive circuit 126, based on the opening and closing control signal that is input from the drive control portion 122, generates a control signal that controls a drive portion (not shown in the drawings) that drives the opening and closing of the tray. The motor drive circuit 128 rotationally drives the spindle motor 110 based on the control signal that is input from the drive control portion 122.

The rotation control portion 130 is a processing portion that performs rotation control processing to rotate the optical disk 114 at a specified revolution speed. As shown in FIG. 1, the rotation control portion 130 is provided with a clock counter 132, a comparison portion 134, a still address control portion 136, and a reference signal generation portion 138.

The clock counter 132 is a measurement portion that counts a clock that can be read off the optical disk 114. Based on the position data signal that is input from the signal processing portion 120 and a reference signal that is generated by the reference signal generation portion 138, which is described later, the clock counter 132 detects a clock count that is used when one of recording to and playing back the optical disk 114 during a single revolution of the optical disk 114. The clock counter 132 then outputs the detected clock count to the comparison portion 134.

The comparison portion 134 is a processing portion that compares the clock count that was detected by the clock counter 132 to a target clock count. The comparison portion 134 computes the difference between the detected clock count and the target clock count, then determines whether or not a still address that is a reference address that serves as a reference for rotation control of the optical disk 114 must be changed. Note that the still address is an address that is played back continuously when still processing is performed that continuously plays back the optical disk 114 by using one-track jump. In a case where it is determined that the still address must be changed, the comparison portion 134 outputs an address change command to the still address control portion 136, which is described below.

The still address control portion 136 is a control portion that carries out the change in the still address that serves as a reference for the rotation control of the optical disk 114. Based on the difference between the clock count that was detected by the clock counter 132 and the target clock count, the still address control portion 136 one of increases and decreases the still address. The still address control portion 136 then outputs the changed still address to the comparison portion 134 and the clock counter 132.

The reference signal generation portion 138 is a processing portion that generates the reference signal that is used for the rotation control. Based on the position data signal that is input from the signal processing portion 120, the reference signal generation portion 138 reads the clock off a surface of the optical disk 114 and generates the reference signal. The reference signal generation portion 138 outputs the generated reference signal to the clock counter 132.

The central control portion 140 is a control portion that controls the drive control portion 122 and a print control portion 151. The central control portion 140 outputs to the drive control portion 122 a recording data signal that is input from an interface portion 145 and outputs to the print control portion 151 an image data signal that is input from the interface portion 145. The central control portion 140 also outputs to the print control portion 151 the position data signal that was input from the drive control portion 122 and that indicates the position information for the optical disk 114.

The interface portion 145 is a connecting portion that connects the optical disk device 100 to an external device, such as a personal computer, for example. The interface portion 145 outputs to the central control portion 140 a signal that is input from the external device and outputs to the external device a signal that is input from the central control portion 140. The signal that is input from the external device may be, for example, a recording data signal that corresponds to recording information that will be recorded on the information recording surface of the optical disk 114, an image data signal that corresponds to visible information that will be printed on the label surface of the optical disk 114, or the like. On the other hand, the signal that is input from the central control portion 140 may be, for example, a playback data signal that is read off the information recording surface of the optical disk 114, or the like.

The printing portion 150 is a functional portion that prints the visible information on the label surface of the optical disk 114 based on the image data signal. As shown in FIG. 1, the printing portion 150 is provided with the print control portion 151, an ink discharge drive circuit 152, a mechanical portion drive circuit 153, a printing head 154, and a head drive motor 155.

The print control portion 151 is a control portion that performs the printing of the visible information on the label surface of the optical disk 114 by controlling the printing head 154, the head drive motor 155, and the like. The print control portion 151 generates ink discharge data based on the image data signal that is input from the central control portion 140. Based on the generated ink discharge data and on the position data signal that is input from the central control portion 140, the print control portion 151 generates a control signal that controls the printing head 154 and the head drive motor 155. The print control portion 151 then outputs the generated control signal to the ink discharge drive circuit 152 and the mechanical portion drive circuit 153.

The ink discharge drive circuit 152 drives the printing head 154 based on the control signal that is input from the print control portion 151. This causes ink droplets to be discharged from a plurality of discharge nozzles in the printing head 154 and to be dropped onto the label surface of the optical disk 114 that is being rotated by the spindle motor 110.

The mechanical portion drive circuit 153 drives the head drive motor 155 based on the control signal that is input from the print control portion 151. Using the mechanical portion drive circuit 153 to drive the head drive motor 155 makes it possible to move the printing head 154 along a guide shaft 156 in the radial direction of the optical disk 114.

The printing head 154 is a functional portion that prints the visible information on the label surface of the optical disk 114 and is disposed such that it faces the label surface of the optical disk 114. The plurality of the discharge nozzles that discharge the ink droplets are provided on a surface of the printing head 154 that faces the label surface of the optical disk 114. The printing head 154 is driven by the ink discharge drive circuit 152 and discharges the ink droplets from the discharge nozzles in the colors of cyan, magenta, yellow, black, and the like, for example.

The head drive motor 155 is a functional portion that moves the printing head 154. The head drive motor 155 is driven by the mechanical portion drive circuit 153 and moves the printing head 154 along the guide shaft 156 in the radial direction of the optical disk 114.

The configuration of the optical disk device 100 according to the present embodiment has been explained above. The optical disk device 100 moves the printing head 154 in the radial direction of the optical disk 114 and prints the visible information on the label surface of the rotating optical disk 114 that is being driven by the spindle motor 110. With this printing method, a printing start position and a printing end position when printing is done all the way around the optical disk 114 are adjacent to one another.

Figure 2:
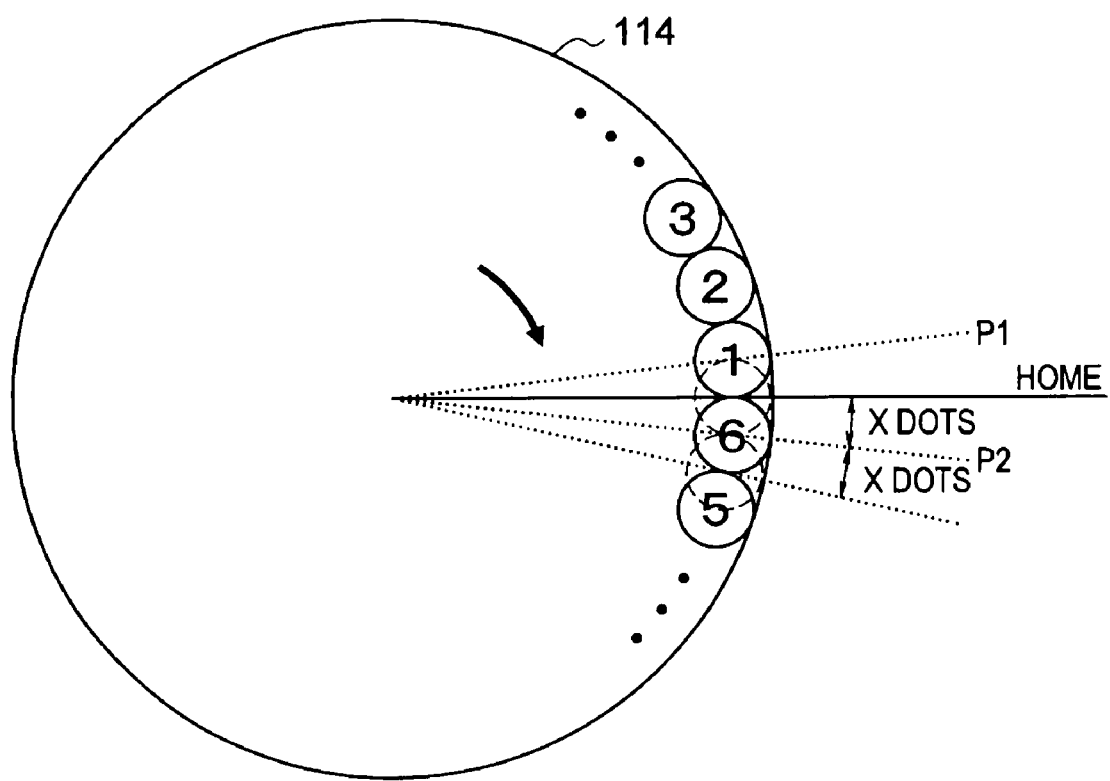
FIG. 2 is an explanatory figure that explains a printing start position and a printing end position in label printing on a rotating optical disk.

For example, as shown in FIG. 2, when the visible information is printed by discharging the ink droplets onto the optical disk 114 when it is rotating clockwise, starting from a reference position HOME, an ink droplet (a starting ink droplet 1) that is discharged at a printing start position P1 is adjacent to an ink droplet (a final ink droplet 6) that is discharged at a printing end position P2. At this time, if the final ink droplet 6 is discharged such that it is out of position by x dots in the direction of the reference position HOME, the final ink droplet 6 will overlap the starting ink droplet 1, causing a difference in the print density to occur due to the overlapping of the ink droplets. Furthermore, in a case where the final ink droplet 6 is discharged such that it is out of position by x dots in the opposite direction from the reference position HOME, there will be a gap between the final ink droplet 6 and the starting ink droplet 1, causing a blank space to occur in the image.

At this time, in a case where the discrepancy in the discharge position of the final ink droplet 6 is not large, the area where the ink droplets overlap will be small, so the difference in the print density will not be noticeable. However, if the discharge position of the final ink droplet 6 is out of the printing end position P2 by more than a specified amount, such as half a dot, for example, the area where the ink droplets overlap will be large, and the difference in the print density will become noticeable.

In order to rotate an optical disk in an optical disk device easily and precisely at a specified revolution speed, a method has been proposed, for example, that makes the revolution speed constant by controlling a spindle motor. For a rotation control clock, this method uses an encoder clock that is provided on the same shaft as the motor. However, the resolution of the encoder is lower than that of the clock on the disk, so precise speed control is believed to be impossible.

Figure 3:
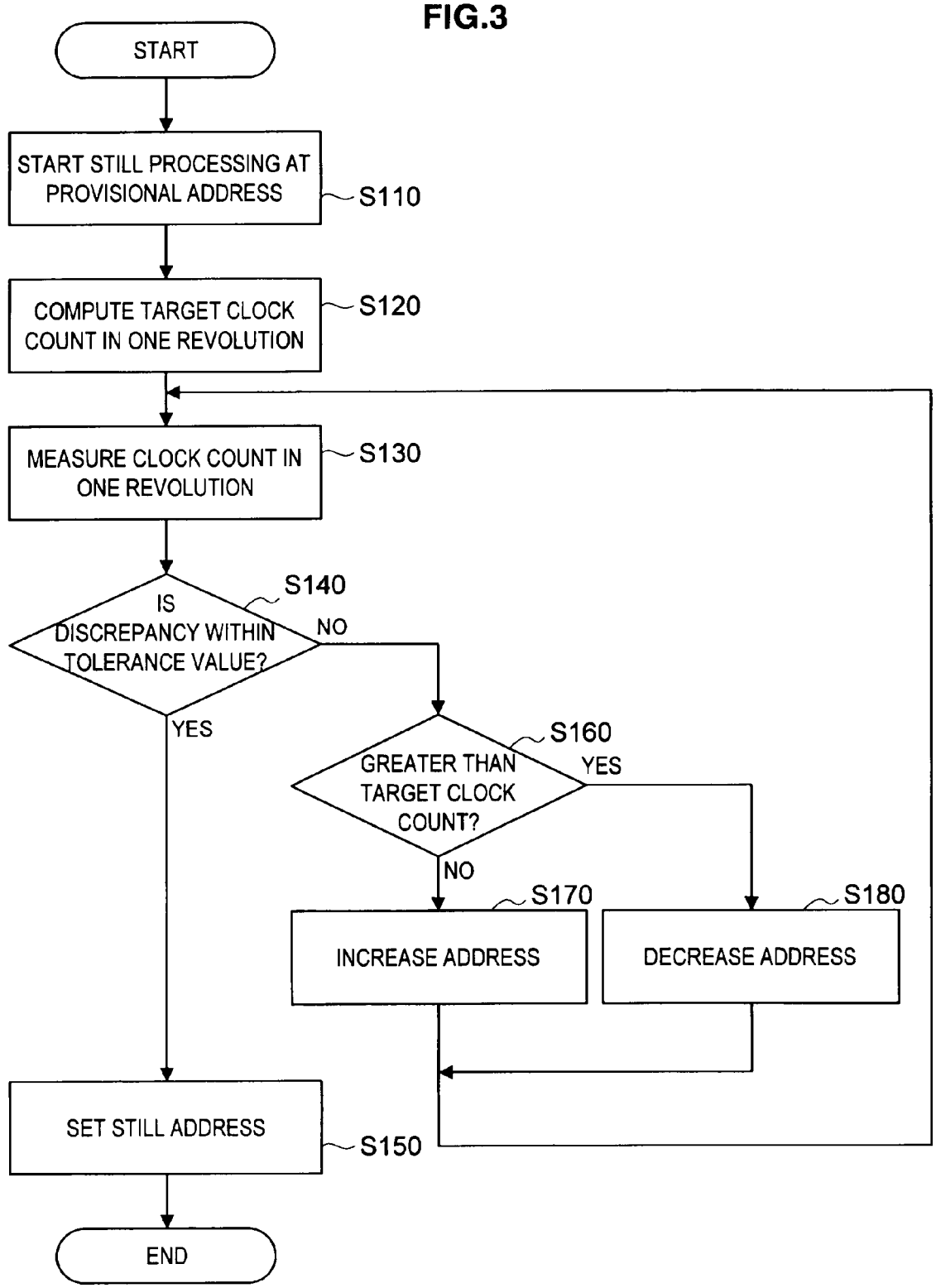
FIG. 3 is a flowchart that shows an optical disk rotation control method according to the present embodiment.
Figure 4:
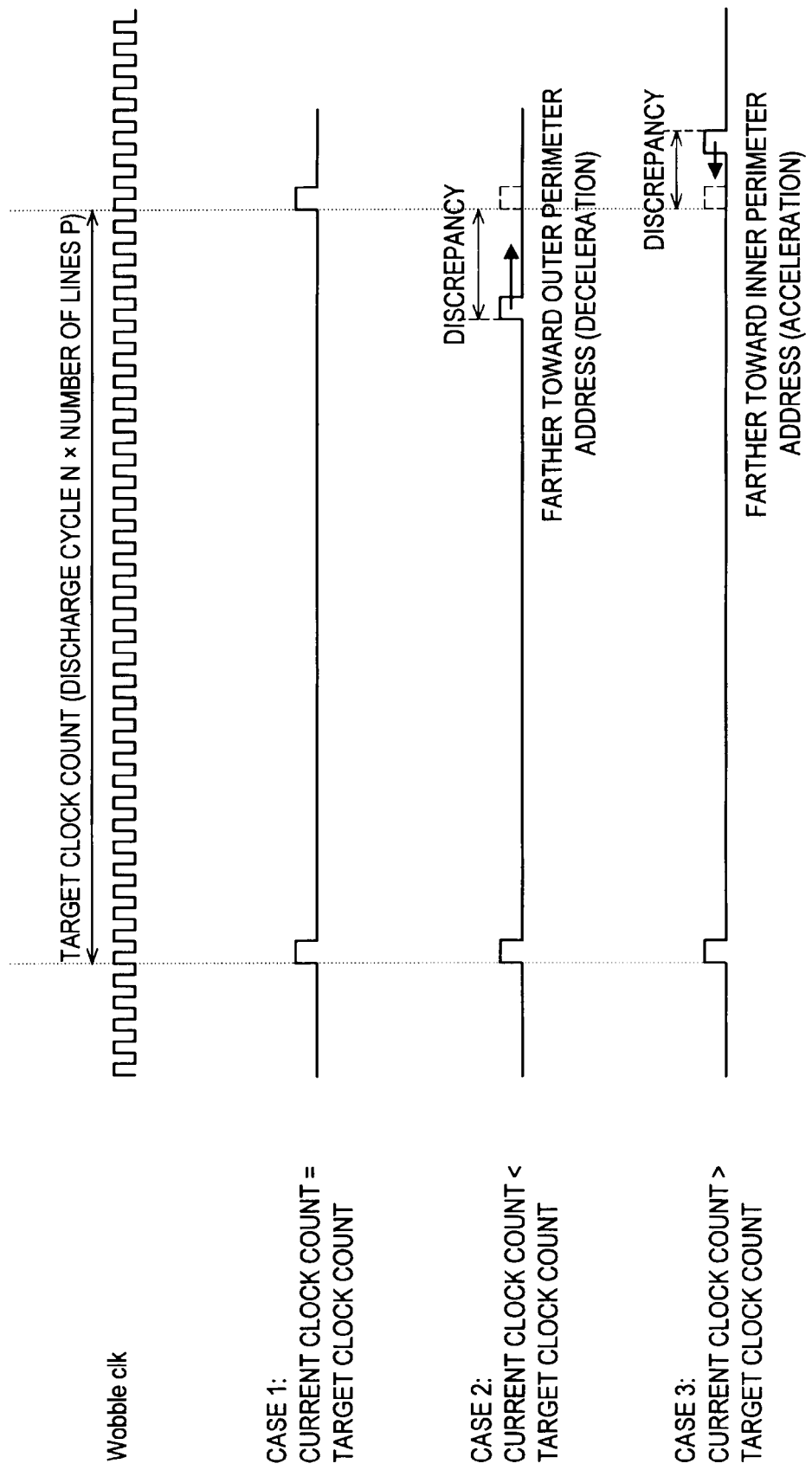
FIG. 4 is an explanatory figure for explaining a method of changing a still address according to the present embodiment.

Accordingly, a feature of the optical disk device 100 according to the present embodiment is that it is provided with the rotation control portion 130, which rotates the optical disk 114 precisely at the specified revolution speed and controls the rotation of the optical disk 114 based on the clock that can be read off a surface of the optical disk 114. This improves the precision of the timing of the discharge of the ink droplets. Hereinafter, an optical disk 114 rotation control method according to the present embodiment will be explained with reference to FIGS. 3 and 4. Note that FIG. 3 is a flowchart that shows the optical disk 114 rotation control method according to the present embodiment. FIG. 4 is an explanatory figure for explaining a method of changing the still address according to the present embodiment.

Optical Disk Rotation Control Method

The rotation control method according to the present embodiment adjusts the still address before the printing on the label surface of the optical disk 114 is performed and rotates the optical disk 114 precisely at the specified revolution speed. As shown in FIG. 3, the rotation control method according to the present embodiment starts still processing of the optical disk 114 at a provisional address (Step S110). The rotation control of the optical disk 114 is generally performed by synchronizing a crystal oscillator of the optical disk device 100 to the clock that can be read off a surface of the optical disk 114. A wobble clock, for example, can be used for the clock that can be read off a surface of the optical disk 114.

At Step S110, one address is first selected as the provisional address from among a plurality of addresses on the optical disk 114. The provisional address is an address that will be continuously played back by the optical pick-up 116 and is provisionally chosen in order to rotate the optical disk 114 at a target revolution speed. A plurality of addresses are recorded on the information recording surface of the optical disk 114, and each of the addresses has an absolute position (a radial position) on the information recording surface. Therefore, continuously playing back the one address among the plurality of addresses makes it possible too rotate the optical disk 114 at a specified speed. It is preferable to set the provisional address such that the revolution speed will be slow, such as by setting the provisional address to an address on the outer edge of the optical disk 114. Once the provisional address is set at Step S110, the still processing that continuously plays back the provisional address by using one-track jump is started.

Next, the target clock count when the optical disk 114 makes one revolution is computed (Step S120). The target clock count is a clock count that serves as a target when the optical disk 114 is rotated at the specified revolution speed. The specified revolution speed at which the optical disk 114 is rotated differs according to the type of the optical disk 114. In the present embodiment, the target clock count is computed by multiplying a discharge cycle N, which indicates the interval at which the ink droplets are discharged, by a number of lines P that are printed when the printing extends all the way around the optical disk 114. In this case, the discharge cycle N is expressed by the wobble clock count. Therefore, the value when the discharge cycle N is multiplied by the number of lines P is the wobble clock count that should be counted when the optical disk 114 makes one revolution, that is, the target clock count.

Next, a current clock count when the optical disk 114 makes one revolution is measured (Step S130). The current clock count L can be measured in the still processing at the provisional address at Step S110 by using the clock counter 132 to count the wobble clock when the optical disk 114 makes one revolution.

Thereafter, the comparison portion 134 determines whether or not a discrepancy between the current clock count L and the target clock count is within a tolerance value (Step S140). The discrepancy between the current clock count L and the target clock count is expressed by the difference (N×P−L) between the current clock count L and the target clock count. The discrepancy influences the error in the discharge position of the final ink droplet, and the greater the discrepancy is, the more the position of the final ink droplet deviates from the discharge position. Therefore, the tolerance value for the discrepancy is set within a range in which the difference in the print density due to the overlapping of the ink droplets will not be noticeable. The tolerance value for the discrepancy is expressed in terms of the clock count and is set, for example, to a clock count that is equivalent to 1/Q dots. For example, a clock count that is equivalent to half a dot (½ dot) can be set as the tolerance value. Note that the clock count that corresponds to one dot can be computed by dividing the discharge cycle N by the number of revolutions M of the optical disk 114 that are necessary in order to print all the way around the optical disk 114.

In a case where it is determined at Step S140 that the discrepancy between the current clock count L and the target clock count is within the tolerance value, the provisional address is set as the still address that will be used in the still address processing (Step S150). Still address setting processing then ends, and printing starts.

On the other hand, in a case where it is determined at Step S140 that the discrepancy between the current clock count L and the target clock count is greater than the tolerance value, a determination is made as to whether or not the current clock count L is greater than the target clock count (Step S160). At this point, as shown in FIG. 4, in a case where the current clock count L matches the target clock count (Case 1), the timing at which the provisional address is read in the still processing always matches the timing at which the target clock count is counted.

In contrast, in a case where the current clock count L is less than the target clock count (Case 2), the timing at which the provisional address is read in the still processing is earlier than in Case 1. In this case, the still address control portion 136 determines that the provisional address is less than the assumed still address and increases the provisional address (Step S170). In other words, the provisional address is set to an address that is closer to the outer edge of the optical disk 114, thus retarding the timing at which the provisional address is read in the still processing.

Furthermore, in a case where the current clock count L is greater than the target clock count (Case 3), the timing at which the provisional address is read in the still processing is later than in Case 1. In this case, the still address control portion 136 determines that the provisional address is greater than the assumed still address and decreases the provisional address (Step S180). In other words, the provisional address is set to an address that is farther to the inside of the optical disk 114, thus advancing the timing at which the provisional address is read in the still processing.

Once the provisional address has been changed at one of Steps S170 and S180, the processing returns to Step S130, where the still processing is performed according to the newly set provisional address and the current clock count L when the optical disk 114 makes one revolution is measured. In this manner, the provisional address is changed such that the current clock count L when the optical disk 114 makes one revolution will be within the tolerance value. Then, when the current clock count L is within the tolerance value, the provisional address is set as the still address. Thereafter, the optical disk 114 can be rotated at precisely the specified revolution speed by rotating the optical disk 114 based on the set still address.

The optical disk 114 rotation control method according to the present embodiment, in order to cause the optical disk 114 to rotate at the specified revolution speed, sets the still address to an address at which the current clock count L when the optical disk 114 makes one revolution and the target clock count are almost identical. At this time, in the optical disk 114 rotation control method according to the present embodiment, a relationship exists between the current clock count L and the target clock count that is expressed by Equation 1 below.

$$N \times P - L < \pm (N/M) \times 1/Q \qquad \text{Equation 1}$$

Here, N is the wobble clock count at the discharge timing, M is the number of revolutions of the optical disk 114 that are necessary in order to print all the way around the optical disk 114, 1/Q dots is the tolerance range for the discrepancy in the position of a dot (indicating what fraction of one dot the discrepancy will not be allowed to exceed), P is the number of lines that are printed when the printing extends all the way around the optical disk 114, and L is the current clock count. As described earlier, the target clock count is computed by multiplying the wobble clock count N by the number of lines P. Therefore, the left side of Equation 1 expresses the discrepancy between the target clock count and the current clock count L. The right side, on the other hand, expresses the tolerable discrepancy (the tolerance range for the discrepancy in the position of a dot) in terms of the clock count. In other words, setting the still address such that it satisfies Equation 1 makes it possible to keep the discharge timing of the ink droplets within a specified range (a discrepancy not greater than 1/Q dots).

The optical disk 114 rotation control method according to the present embodiment has been explained above. According to the present embodiment, the ink droplets are discharged and printed on the label surface based on the clock that can be read off a surface of the optical disk 114. In order to improve the discharge timing of the ink droplets during this process, the rotation of the optical disk 114 is controlled based on the clock that can be read off a surface of the optical disk 114. During this process, a determination is made as to whether or not the optical disk 114 is being rotated at the specified revolution speed by keeping the current clock count L when the optical disk 114 makes one revolution within the specified range from the target clock count. Performing the rotation control in this manner, using the clock that is built into the optical disk 114 instead of the revolution speed of the optical disk 114, makes it possible to rotate any particular optical disk 114 accurately at the specified revolution speed. Moreover, because the rotation control can be performed using the existing clock that can be read off a surface of the optical disk 114, the control can be performed more easily.

Second Embodiment

Next, an optical disk 114 rotation control method according to a second embodiment of the present invention will be explained based on FIGS. 5 and 6. During the printing on the label surface of the optical disk 114, if the revolution speed of the optical disk 114 is high, it is not possible to print all of the lines that will be printed all the way around the optical disk 114 in the time it takes for the optical disk 114 to make one revolution, because the ink droplet discharge timing cannot keep pace with the revolution speed. In that case, the printing on the label surface can be performed, for example, by using interleaf printing that shifts the printing start position by one dot every time the optical disk 114 makes one revolution.

Accordingly, the optical disk 114 rotation control method that is used in the interleaf printing will be explained below. Note that FIG. 5 is an explanatory figure for explaining the printing processing according to the present embodiment. FIG. 6 is an explanatory figure for explaining a method of changing the still address. Note also that the configuration of the optical disk device 100 is same as in the first embodiment, so its explanation will be omitted.

In the printing processing of the optical disk device 100 according to the present embodiment, an image that extends all the way around the optical disk 114 (that is, an image that covers an area having a width l of a nozzle array on the printing head 154 in the radial direction and extending 360 degrees in the circumferential direction) is printed while the optical disk 114 is rotated for a plurality of revolutions. During this process, the printing start position is shifted every time the optical disk 114 makes one revolution, based on the clock that can be read off a surface of the optical disk 114.

Figure 5:
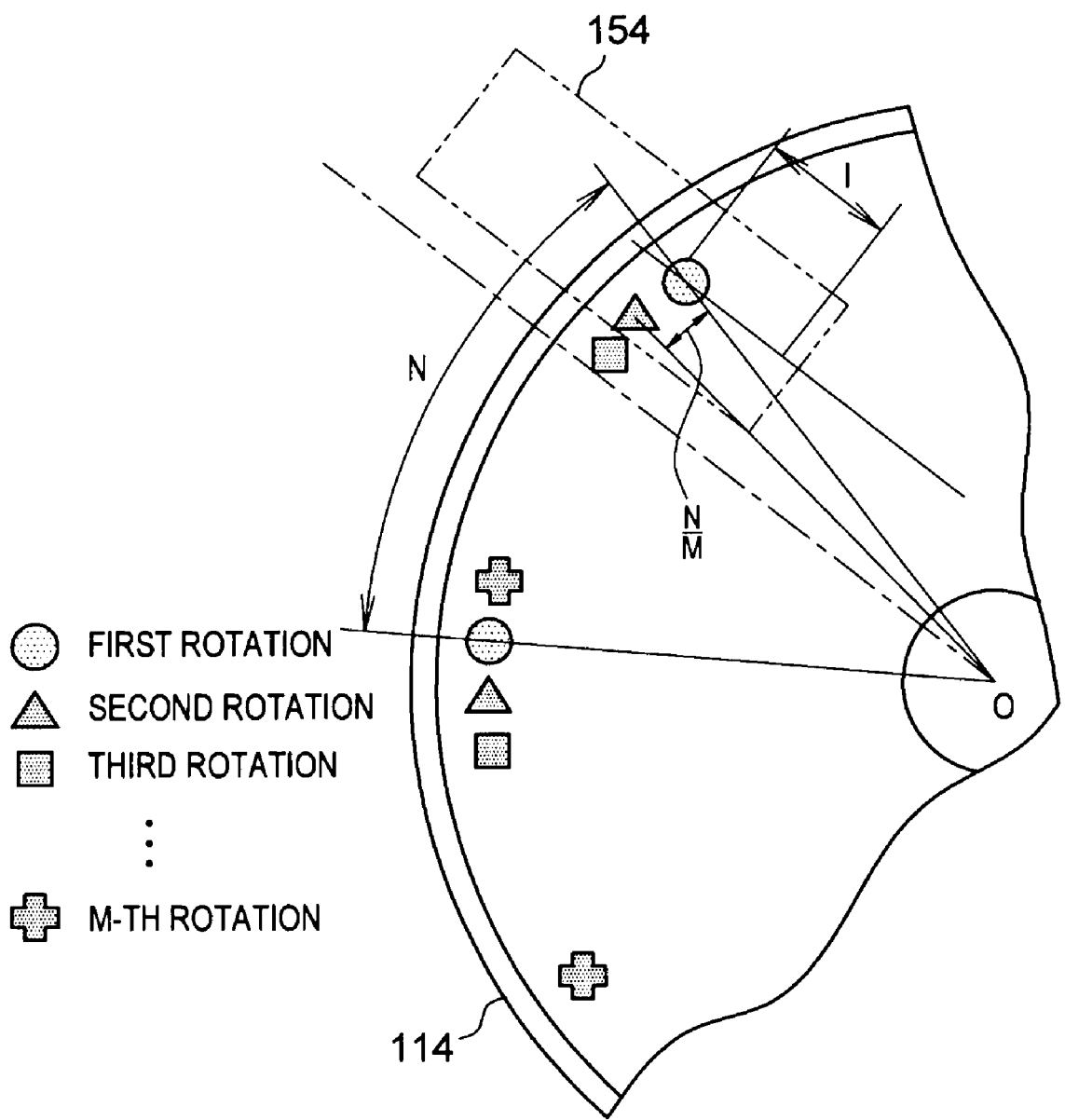
FIG. 5 is an explanatory figure for explaining interleaf printing.

For example, in a case where the optical disk 114 is rotated for M revolutions in order to print the image that extends all the way around the optical disk 114, as shown in FIG. 5, the interval at which the ink droplets are discharged is set to be equal to the clock count N. At this time, the clock count from one dot to the next is expressed as N/M. For example, in a case where the optical disk 114 is rotated for six revolutions to form the image that extends all the way around the optical disk 114, the discharge timings for the ink droplets will be as shown in FIG. 6. In the present embodiment, the wobble clock is read off a surface of the optical disk 114, and the optical disk 114 is rotated at the specified speed based on the wobble clock count. The reference signal is a signal that indicates the timing at which the still address is read. In the printing that extends all the way around the optical disk 114, the printing during the first revolution starts at the time when the reference signal becomes on, as shown in FIG. 6, and the ink droplets are discharged for a specified interval (the clock count N).

When the printing during the first revolution is finished, the printing start position is shifted by one dot, and the printing during the second revolution starts. At this point, the shift of one dot is equivalent to the clock count N/M, so the first ink droplet is discharged after the clock count N/M elapses after the reference signal becomes on. The printings for the third revolution, the fourth revolution, the fifth revolution, and the sixth revolution are performed by successively shifting the printing start position. The image that extends all the way around the optical disk 114 can thus be printed on the label surface. Thereafter, the printing head 154 is moved in the radial direction of the optical disk 114, starting from the printing start position for the first revolution in the first round of printing that extends all the way around the optical disk 114, for example, and print processing for a second round of printing that extends all the way around the optical disk 114 is started in the same manner as for the first round. After this operation is repeated for a third round and a fourth round, the printing of the entire label surface of the optical disk 114 is finished.

During this process, differences in the print density due to the overlapping of the ink droplets are kept from becoming noticeable by keeping the overlapping of the starting ink droplet that is discharged at the printing start position of the first revolution and the final ink droplet that is discharged at the printing end position of the sixth revolution that is the final revolution within a specified range. The specified range can be, for example, within x dots from the discharge position of the first ink droplet, such as half a dot (½ dot), for example. It is therefore necessary to rotate the optical disk 114 at precisely the specified revolution speed.

Accordingly, in the optical disk 114 rotation control according to the present embodiment, in the same manner as in the first embodiment, the still address is set to an address at which the current clock count when the optical disk 114 makes one revolution and the target clock count are almost identical. In other words, the still address that serves as the standard for the rotation control of the optical disk 114 is set such that it satisfies Equation 1. In this manner, setting the still address such that the discrepancy between the target clock count and the current clock count is within the tolerance range makes it possible to keep the discharge timing of the ink droplets within the specified range (a discrepancy not greater than 1/Q dots).

The optical disk 114 rotation control method according to the second embodiment has been explained above. In the present embodiment, the discrepancy of the final ink droplet in relation to the first ink droplet is controlled by using the wobble clock that is the clock that can be read off a surface of the optical disk 114 to control the shifting of the printing start positions in the interleaf printing. Using the clock that is built into the optical disk 114 in this manner, instead of the revolution speed of the optical disk 114, makes it possible to control the disk rotation precisely. It is therefore possible to control the ink droplet discharge timing with high precision, which makes it possible to keep the point where the printing start position and the printing end position meet from becoming noticeable. In addition, because it is possible to perform the rotation control by using the existing clock that can be read off a surface of the optical disk 114, it becomes easier to perform the control.

It should be understood by those skilled in the art that various modifications, combinations, sub-combinations and alterations may occur depending on design requirements and other factors insofar as they are within the scope of the appended claims or the equivalents thereof.

For example, in the embodiments described above, an ink jet system was explained, but the present invention is not limited to this example. For example, a thermal system may be used, and the timing at which heat is applied may be controlled based on a clock that can be read off a surface of the optical disk.

The present application contains subject matter related to that disclosed in Japanese Priority Patent Application JP 2008-131251 filed in the Japan Patent Office on May 19, 2008, the entire content of which is hereby incorporated by reference.

What is claimed is:

1. An optical disk device, comprising:
   a rotational drive portion that rotates a recording medium, on an information recording surface of which a plurality of addresses are recorded;
   an optical pick-up that records an information signal onto and plays back the information signal from the information recording surface of the recording medium that is rotated by the rotational drive portion; and
   a control portion that controls the rotation of the recording medium through the rotational drive portion, wherein
   the control portion performs control based on a first reference signal that can be read off the recording medium, such that the recording medium is rotated at a speed that is based on a specified clock count, and
   the control portion includes
   a reference signal generation portion that generates a second reference signal based on the first reference signal,
   a measurement portion that, based on the second reference signal, measures a current clock count during one revolution of the recording medium, based on a specified reference address among the plurality of the addresses that serves as a reference for rotation control,
   a comparison portion that compares the current clock count that is measured by the measurement portion and a target clock count during one revolution of the recording medium, and
   a reference address control portion that changes the reference address based on a result of the comparison by the comparison portion.

2. The optical disk device according to claim 1, wherein the comparison portion determines whether a difference between the current clock count and the target clock count is within a specified count, and
   the reference address control portion changes the reference address in a case where the difference between the current clock count and the target clock count is greater than the specified count.

3. The optical disk device according to claim 2, wherein the reference address control portion decreases the reference address in a case where the current clock count is greater than the target clock count and increases the reference address in a case where the current clock count is less than the target clock count.

4. The optical disk device according to claim 1, further comprising:
   a printing head that discharges ink droplets onto a label surface of the recording medium,
   wherein the comparison portion determines the target clock count based on a dot interval clock count that indicates an interval between the ink droplets and on a number of lines that are printed during one revolution of the recording medium.

5. The optical disk device according to claim 4, wherein the reference address control portion changes the reference address such that an amount of overlap of the ink droplets that are discharged from the printing head onto the label surface of the recording medium at a printing start position and a printing end position is not greater than a specified interval.

6. A rotation control method, comprising:
   rotating a recording medium, on an information recording surface of which a plurality of addresses are recorded;
   recording an information signal onto and playing back the information signal from the information recording surface of the rotated recording medium; and
   controlling the rotation of the recording medium, wherein
   the controlling the rotation of the recording medium is performed based on a first reference signal that can be read off the recording medium, such that the recording medium is rotated at a speed that is based on a specified clock count, and
   the controlling the rotation of the recording medium further includes
   generating a second reference signal based on the first reference signal,
   measuring, based on the second reference signal, a current clock count during one revolution of the recording medium, based on a specified reference address among the plurality of the addresses that serves as a reference for rotation control,
   comparing the measured current clock count and a target clock count during one revolution of the recording medium, and
   changing the reference address based on a result of the comparing.

* * * * *